United States Patent Office 3,493,542
Patented Feb. 3, 1970

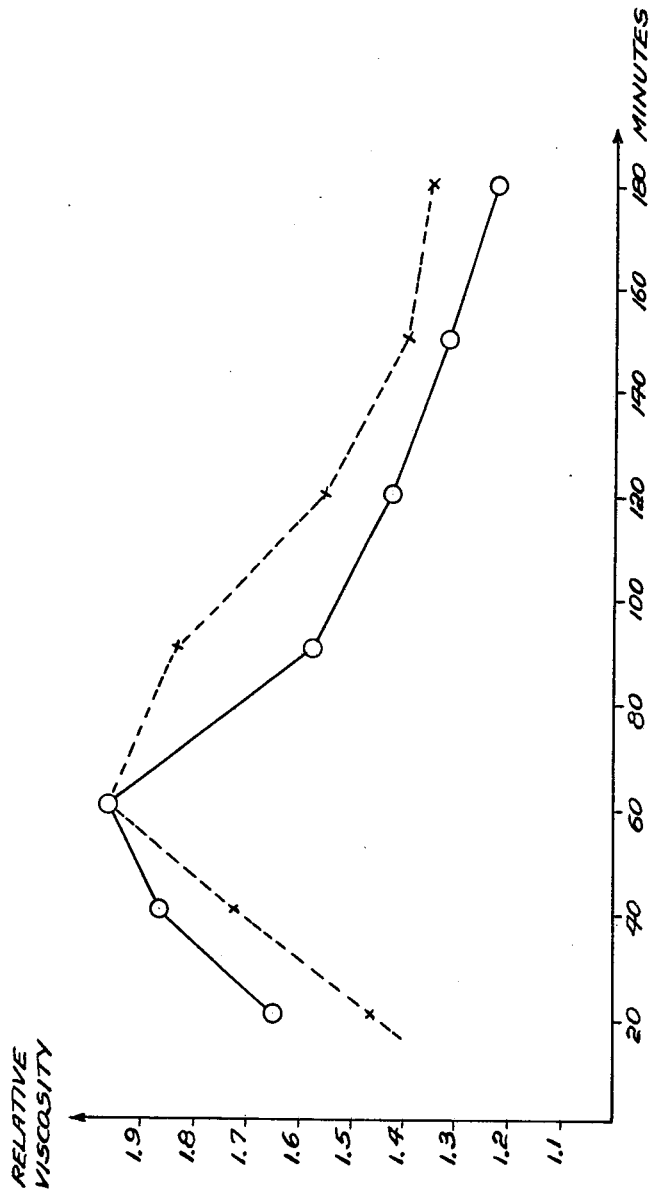

3,493,542
METHOD FOR THE PREPARATION OF POLY-[1,4 - BIS - (HYDROXYMETHYL)-CYCLOHEXANE-TEREPHTHALATE]
Roland Feinauer, Haltern, Germany, assignor to Chemische Werke Huls Aktiengesellschaft, Marl, Germany, a corporation of Germany
Filed Dec. 30, 1966, Ser. No. 606,333
Claims priority, application Germany, Feb. 18, 1966, C 38,261
Int. Cl. C08g 17/013, 17/08
U.S. Cl. 260—75                                    1 Claim

ABSTRACT OF THE DISCLOSURE

A method for the preparation of high molecular weight poly-[1,4-bis-(hydroxymethyl) - cyclohexane - terephthalate] by utilizing as catalysts complex compounds of the general formula

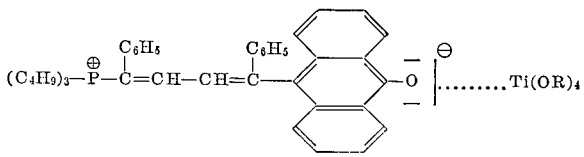

in which R represents a short alkyl radical with 1 to 4 carbon atoms. The method is carried out by transesterification of a dialkyl ester of terephthalic acid and 1,4-bis-(hydroxymethyl)-cyclohexane in the presence of the complex compounds described above, followed by polycondensation.

---

The invention relates to a method for the preparation of high molecular weight poly-[1,4-bis-(hydroxymethyl)-cyclohexane-terephthalate] with the aid of special catalysts.

It is known, for example from Houben-Weyl, Methoden der Organischen Chemie, volume XIV/2, pages 12 to 20 (1963), that high molecular polyesters of terephthalic acid are obtainable by the reaction of terephthalic acid dialkyl esters with glycols and subsequent polycondensation of the bis-(hydroxyalkyl)-terephthalates so formed. Catalysts employed for this purpose are for example mineral acids, alkali and alkaline earth metal hydroxides, hydrides and alcoholates, salts and oxides of zinc, mercury and lead, antimony trioxide, metal enolates such as zinc acetylacetonate, organic tin compounds as well as alcoholates and complex compounds of the titanium.

The employment of titaniumtetraisopropylate or of complex titanium compounds of the type Na[HTi(OC₄H₉)₆] is particularly advantageous for the preparation of poly-[1,4-bis-(hydroxymethyl)-cyclohexane-terephthalate] -(U.S. Patent No. 2,901,466).

It is also known from "Faserforschung und Textiletechnik 15" (1962), page 481 that polyesters prepared in the presence of metal-containing catalysts have a tendency to depolymerize under the high temperatures of the polycondensation. This is particularly disadvantageous if, after polycondensation, the process requires an extensive sojourn time at such temperatures, as in case of continuous processing or subsequent substantive spinning.

The attempt had been made to improve the thermal stability of the poly-(ethylene-glycol-terephthalate), prepared with the aid of metal-containing catalysts, by the admixture of phosphorus containing compounds such as phosphites and phosphates ("Faserforschung und Textiltechnik 15" (1962), p. 481; "Chim. volokna 4" (1964), p. 28). However, these additives do not accomplish the desired results. Their blockage of the catalyst does reduce the thermal damage to the batch of molten material but at the same time hinders a support of the viscosity through additional condensation reactions. Therefore, the admixture of phosphites and phosphates will not improve matters in general.

The invention solves the problem of preparing high-molecular poly-[1,4-bis-(hydroxymethyl)-cyclohexane - terephthalate] from terephthalic acid dialkyl esters and 1,4-bis-(hydroxymethyl)-cyclohexane with the aid of a catalyst which will slow down the thermal degradation of the polymer, but without lengthening the time required for polycondensation.

This problem is solved by the invention by utilizing as catalysts complex-compounds of the general formula

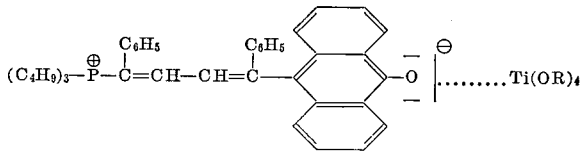

in which R represents a short alkyl radical with 1 to 4 carbon atoms, in quantities ranging from .01 to 1 percent by weight, relative to the terephthalic acid dialkyl ester.

The complex-compounds employed in the method of the invention can be prepared in simple manner from 1-tri-n-butylphosphine-1,4-diphenyl - 4 - [anthrone-(9)-ylidene-(10)]-butene-(2) and the corresponding titanium alcoholates, for example titanium tetramethylate, titanium tetraisopropylate, titaniumtetrabutylate or titaniumtetraamylate in the presence of an inert solvent such as butanol. The preparation of the complex-compounds is not being claimed. The preparation of 1-tri-n-butyl-phosphine-1,4-diphenyl-4-[anthrone - (9) - ylidene - (10)] - butene-(2) is disclosed by "Angewandte Chemie 77" (1965), page 1011.

The method of the invention is carried out by transesterification at 200° C., in a manner known per se, of a dialkyl ester of terephthalic acid, preferably dimethylterephthalate, and 1,4-bis-(hydroxymethyl)-cyclohexane in the presence of the complex compounds described above, folowed by a polycondensation at 305° C.

The advantages of the method of the present invention are demonstrated by the examples given below. As comparison is used the known preparation of poly-[1,4-bis-(hydroxymethyl) - cyclohexane - terephthalate] with titaniumtetraisopropylate being used as catalyst.

COMPARATIVE EXAMPLE USED AS CONTROL 42.7 g. (.22 mol) of dimethylterephthalate and 69.2 g. (.48 mol) of 1,4-bis-(hydroxymethyl)-cyclohexane with the addition of .021 g. (.05 percent by weight relative to the dimethylterephthalate) of titanium-tetraisopropylate were trans-esterified in a polycondensation tube for three hours at 200° C. and then subjected to polycondensation at 305° C., with a vacuum being applied gradually. After a vacuum of .5 mm. Hg. had been reached, specimens of the mixture were removed at various times and their relative viscosities determined. In order to remove the specimen, the vacuum was interrupted (nitrogen supply) and then re-applied.

The relative viscosities of the specimens so removed was tested in a phenol-tetrachloroethane mixture (60:40) with a concentration of 1 g./100 ml. at 25° C.

EXAMPLE OF METHOD OF THE INVENTION

The condensation was carried out in the same manner as in the above given comparative example, but as the catalyst there was used .021 g. (.05 percent by weight relative to the dimethylterephthalate) of the complex-compound of the general structure set forth above (R=isopropyl).

The results are listed in Table I and plotted graphically in the accompanying drawing in which ordinates represent relative viscosity, abscissa represent polycondensation time in minutes, the broken line curve represents the example for comparison and the solid line curve represents Example 1.

TABLE 1.—RELATIVE VISCOSITIES AFTER VARIOUS PERIODS OF POLYCONDENSATION

| | Time in minutes after application, of a vacuum of .5 mm. Hg | | | | | | |
|---|---|---|---|---|---|---|---|
| | 20 | 40 | 60 | 90 | 120 | 150 | 180 |
| Example for comparison | 1.65 | 1.88 | 1.96 | 1.58 | 1.42 | 1.32 | 1.23 |
| Example of the invention | 1.46 | 1.73 | 1.98 | 1.84 | 1.56 | 1.40 | 1.43 |

A comparison of the values given in the table indicates that in case of use of the catalysts according to the invention the viscosity maximum is attained in the same time period as in case of known catalysts while the viscosity degrading takes place at a substantially slower rate.

I claim:

1. In the process of preparing high-molecular weight poly-[1,4 - bis - (hydroxymethyl)-cyclohexaneterephthalate] by transesterification and polycondensation from a terephthalic acid dialkyl ester and 1,4-bis-(hydroxymethyl)-cyclohexane in the presence of a catalyst, the improvement which consists in slowing down thermal degradation of the polymer without lengthening the time required for polycondensation by carrying out said transesterification and polycondensation in the presence of a catalyst of the general formula

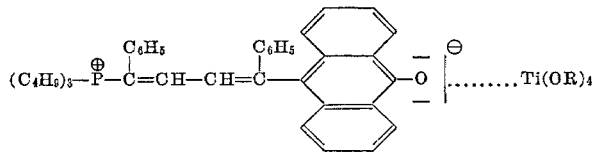

in which R represents a short alkyl radical, in quantity within the range from .01 to 1% by weight, relative to the terephthalic acid dialkyl ester, which catalyst catalyzes a transesterification as well as a polycondensation reaction.

References Cited
UNITED STATES PATENTS

| 2,901,466 | 8/1959 | Kibler et al. | 260—75 |
| 2,989,499 | 6/1961 | Linville et al. | 260—75 |
| 3,053,809 | 9/1962 | Linville et al. | 260—75 |

WILLIAM H. SHORT, Primary Examiner

L. P. QUAST, Assistant Examiner

U.S. Cl. X.R.

260—429.5, 475, 590, 606.5